G. H. STAHL.
TEMPERATURE CONTROLLING DEVICE FOR STORAGE BATTERIES.
APPLICATION FILED MAY 17, 1913.
1,098,692.
Patented June 2, 1914.
2 SHEETS—SHEET 1.
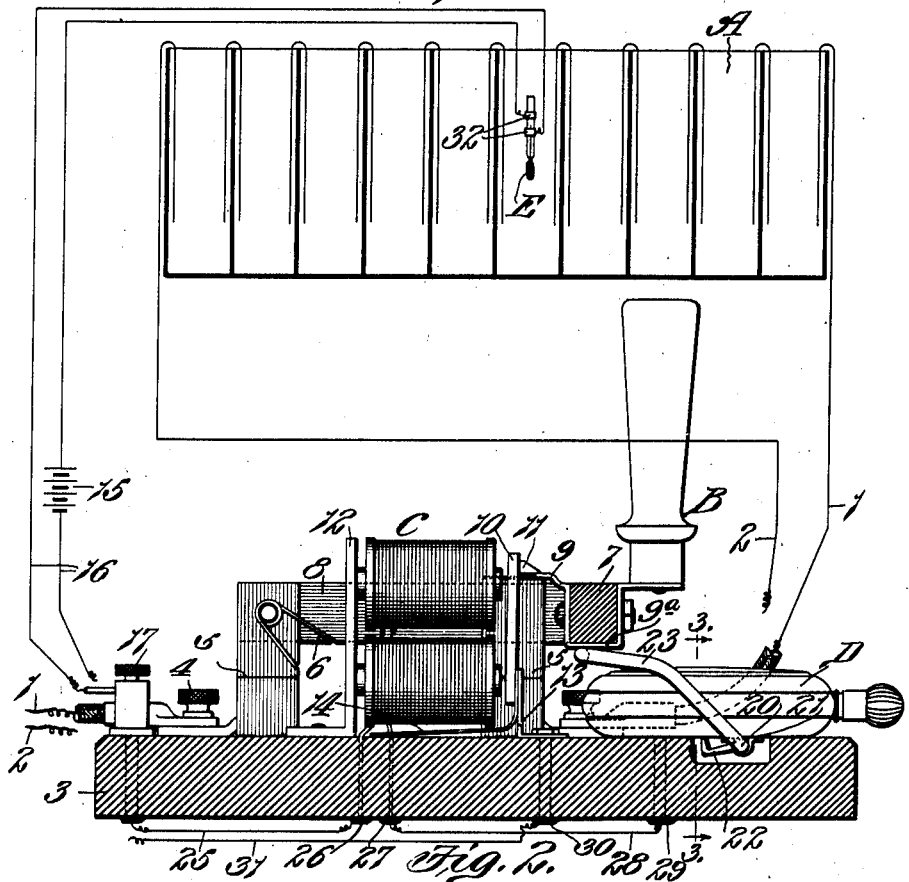
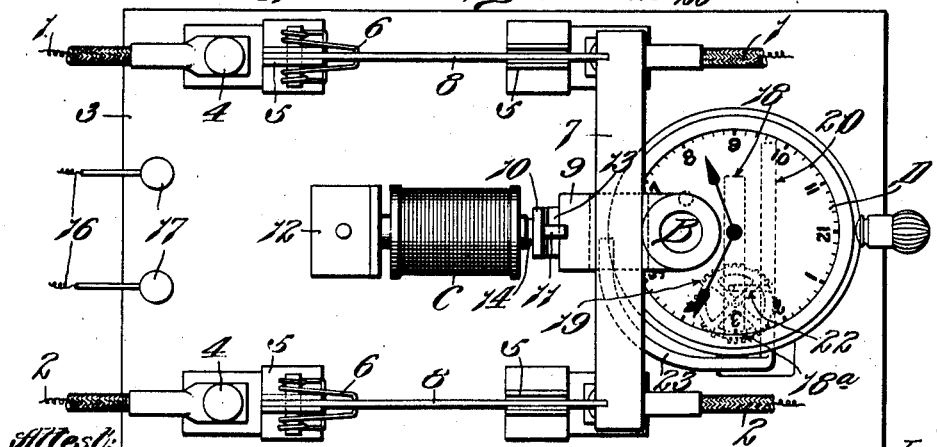

G. H. STAHL.
TEMPERATURE CONTROLLING DEVICE FOR STORAGE BATTERIES.
APPLICATION FILED MAY 17, 1913.

1,098,692.

Patented June 2, 1914.
2 SHEETS—SHEET 2.

UNITED STATES PATENT OFFICE.

GEORGE H. STAHL, OF QUINCY, ILLINOIS, ASSIGNOR TO THE STAWIL COMPANY, OF QUINCY, ILLINOIS, A CORPORATION OF ILLINOIS.

TEMPERATURE-CONTROLLING DEVICE FOR STORAGE BATTERIES.

1,098,692.     Specification of Letters Patent.     Patented June 2, 1914.

Application filed May 17, 1913. Serial No. 768,217.

*To all whom it may concern:*

Be it known that I, GEORGE H. STAHL, a citizen of the United States, residing at Quincy, Illinois, have invented a certain new and useful Improvement in Temperature-Controlling Devices for Storage Batteries, of which the following is a full, clear, and exact description, such as will enable others skilled in the art to which it appertains to make and use the same.

This invention relates to devices such as are used for controlling the current supplied to a storage battery during the operation of charging same, and has for its main object to provide a device of novel construction that will automatically cut off the charging current when the temperature in the battery reaches a certain degree, and thus prevent the battery from being damaged or destroyed.

Another object is to provide a device of the character mentioned that comprises a time-indicator such, for example, as a clock or watch, and means for stopping same automatically when the charging current is cut off so as to indicate how long the battery has been in charge.

Figure 3:
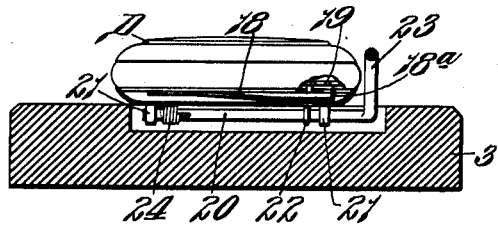
Figure 4:
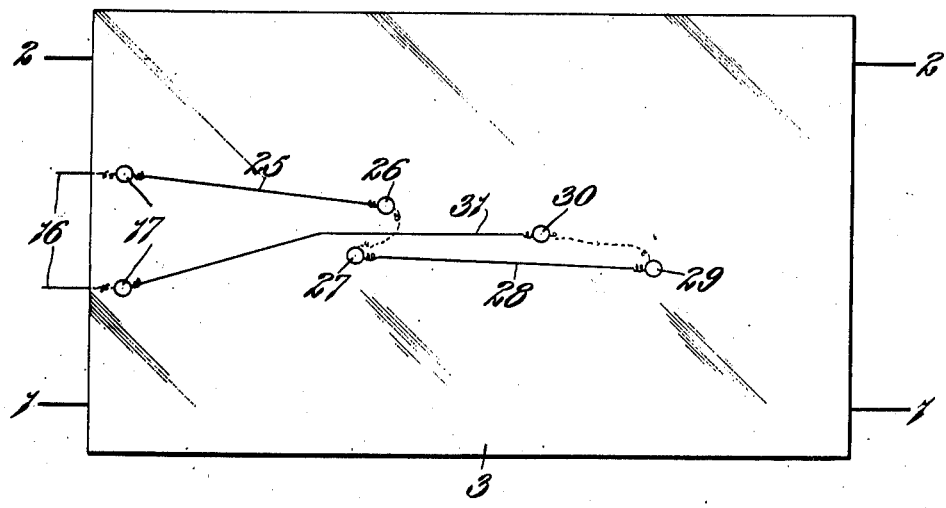

Figure 1 of the drawings is a longitudinal horizontal sectional view of my improved controlling device, the storage battery being shown diagrammatically; Fig. 2 is a front elevational view of the device; Fig. 3 is a transverse sectional view taken on the line 3—3 of Fig. 1; and Fig. 4 is a rear elevational view of the device.

Referring to the drawings which illustrate the preferred form of my invention, A designates a storage battery and 1 and 2 designate supply conductors that lead from a source of electrical energy, not shown.

My improved controlling device is arranged in the supply circuit, and consists of a switch of any suitable type for opening the supply circuit so as to cut off the current that is being supplied to the battery A to charge same, means governed by the temperature in the storage battery for causing said switch to open automatically and thus break the supply circuit when the temperature in the battery reaches a certain degree, and a time-indicating means that stops automatically when said switch is opened. The switch B herein shown is of the knife type, and is mounted on a base plate or block 3 of insulating material. The supply conductors 1 and 2 are connected to binding posts 4 on the base plate that coöperate with clips 5 for the blades of the switch B, and springs 6 are combined with said blades so as to open the switch automatically and thus cut off the charging current when the blades are released as hereinafter described. The cross-bar 7 that connects the two blades 8 of the switch together is provided with a lip 9, and an electrically-operated locking means coöperates with said lip to hold the switch closed until the temperature in the battery A reaches a certain degree.

In the embodiment of my invention herein shown, the electrically-operated locking means just mentioned consists of an electric magnet C whose armature 10 is provided with a lug or catch 11 that laps over the lip 9 on the cross-bar of the switch B when said switch is closed and the magnet C is demagnetized, the coils of said magnet being mounted on a bracket 12 on the base plate 3, and the armature 10 of the magnet being supported by a resilient arm 13 that is fastened to the base plate, as shown in Fig. 1. I also prefer to equip the device with a spring for moving the armature 10 away from the cores of the coils of the magnet C when the circuit that energizes said magnet is broken, the springs herein shown consisting of a leaf-spring 14 that is connected to the lower end of the armature 10 in such a manner that it will bear upon the base plate 3 and thus be placed under tension when the circuit that energizes the magnet C is closed.

The magnet C is energized by a separate electric circuit consisting of a source of electrical energy 15, conductors 16 that lead to binding posts 17 on the base plate 3, and connectors and devices on the base plate 3 for establishing electrical connection between the binding posts 17 and the coils and armatures of the magnet C.

As previously stated, one of the novel features of my invention consists in a time-indicator and means for stopping said time-indicator when the charging current is cut off so as to show how long the storage battery A has been in charge. In the device herein shown the time-indicator consists of a clock or watch D mounted on the base plate 3, and provided with a movable part or member 18 shown in broken lines in Fig. 2 and in full lines in Fig. 3 that is adapted to engage some element of the time-indicator D and thus stop it when the switch B is opened, the movable member 18 of the time-indicator herein shown consisting of a flat leaf-spring provided with a projection 18ᵃ, as shown in Fig. 3, that engages the balance-wheel 19 of the time-indicator under certain conditions. The means that actuates the balance-wheel-arresting member 18 consists of a rock shaft 20 journaled in bearings 21 on the rear side of the time-indicator D and provided with a finger 22 that is adapted to engage and move the balance-wheel-arresting member 18. Said rock shaft 20 is provided at one end with an arm 23 arranged in such a manner that it will be acted upon by the cross-bar 7 of the switch B when the switch is closed, as shown in Fig. 1, said cross-bar exerting sufficient pressure on the arm 23 to hold the rock shaft 20 in such a position that the finger 22 thereon is out of engagement with the balance-wheel-arresting member 18. When the switch B opens and the cross-bar 7 of same ceases to exert pressure on the arm 23 a coiled spring 24, that is combined with the rock shaft 20 as shown in Fig. 3, turns said shaft into such a position that the finger 22 thereon engages the balance-wheel-arresting member 18 and forces the projection 18ᵃ on said member into engagement with the balance-wheel 19 of the time-indicator D, thereby causing the indicator to stop. The rock shaft 20 and finger and arm thereon are formed of metal and the cross-bar 7 is provided with a metallic portion 9ᵃ that bears upon the arm 23 when the switch is closed, as shown in Fig. 1, said metallic portion 9ᵃ preferably consisting of a piece of metal that forms the lip 9 on the cross-bar 7. The current that energizes the magnet C flows through a connector 25 on the rear side of the base plate 3 that leads from one of the binding posts 17 to a contact 26 to which one end of the winding of the coils of the magnet is connected. The other end of the winding of the coils is connected to a contact 27 in the base plate, and a connector 28 leads from said contact 27 to a contact 29 which is connected to some metallic part of the time-indicator D. When said circuit is closed, as hereinafter described, the current flows through the time-indicator and through the rock shaft 20 and the finger and arm thereon to the lip 9 that coöperates with the catch on the armature of the magnet C and thence from said armature through a contact 30 and connector 31 to the other binding post 17, as shown in Fig. 4. This circuit, namely, the circuit that energizes the magnet C, is normally open, and the means that I prefer to use for closing said circuit so as to move the locking device 11 into an inoperative position and thus permit the switch B to open, consists of a thermometer E that is arranged in the storage battery A, as shown in Fig. 1. Said thermometer comprises two contacts 32 to which the conductors 16 of the magnet-energizing circuit are connected, as shown in Fig. 1. When the temperature of the battery A reaches a certain degree the mercury of the thermometer E rises high enough to complete the circuit through the contacts 32 and thus cause the magnet C to be energized, thereby causing the armature 10 of the magnet to move into such a position that the locking device 11 thereon does not engage the lip 9 on the cross-bar of the switch B. The springs 6 that coöperate with the blades of said switch immediately move said blades out of engagement with their coöperating blade-clips on the base plate and thus cuts off the charging current that is being supplied to the storage battery A. As soon as the switch B opens and thus takes the pressure off the arm 23 of the rock shaft 20 the spring 24 moves said shaft into such a position that the finger 22 thereon forces the balance-wheel-arresting member 18 into engagement with the balance-wheel of the time-indicator D, thereby causing the indicator to stop.

From the foregoing it will be seen that my improved controlling device not only cuts off the current that is being supplied to the battery to charge same when the temperature in the battery reaches a certain degree but it also shows how long the battery has been in charge owing to the fact that the device comprises a time-indicator and means for stopping same automatically when the charging circuit is opened. This is a very desirable feature of a controlling device of the character described for it shows just how long the charging current had been flowing through the storage battery before the temperature rose high enough to cause the charging current to be cut off and thus enables the operator in charge of the device to resume the charging operation in case the charging current was cut off prematurely or before the time necessary to completely charge the battery.

Having thus described my invention, what I claim as new and desire to secure by Letters Patent is:

1. In a battery-charging device of the character described, a charging circuit that is adapted to be connected to a storage battery, a switch in said charging circuit, means whereby said switch opens automatically when the temperature in the battery reaches a certain degree, a time-indicator, and a stopping device for said indicator governed by said switch so as to cause the time-indicator to stop when the switch opens.

2. In a battery-charging device of the character described, a charging circuit that is adapted to be connected to a storage battery, a switch in said charging circuit, means whereby said switch opens automatically when the temperature in the storage battery reaches a certain degree, a time-indicator provided with a balance-wheel-arresting member, and an actuating means for said member controlled by said switch and arranged in such a manner that it causes said balance-wheel-arresting member to become operative when said switch is opened.

3. In a battery-charging device of the character described, a charging circuit that is adapted to be connected to a storage battery, a switch in said charging circuit, means whereby said switch opens automatically when the temperature in the storage battery reaches a certain degree, a time-indicator provided with a balance-wheel-arresting member, and a spring-actuated rock shaft having a part that coöperates with said balance-wheel-arresting member and a part that coöperates with said switch substantially as and for the purpose specified.

4. In a battery-charging device of the character described, a charging circuit that is adapted to be connected to a storage battery, a switch arranged in said charging circuit, a locking device for holding said switch closed, an electric magnet for moving said locking device into an inoperative position, a thermometer arranged in the storage battery for automatically closing the circuit that energizes said magnet when the temperature in the battery reaches a certain degree, a time-indicator, and means for causing said indicator to stop when said switch opens.

5. A battery-charging device comprising a charging circuit that is adapted to be connected to a storage battery, a spring-actuated switch in said charging circuit, an electric magnet whose armature is provided with a locking device for holding said switch in its closed position, a separate circuit for energizing said magnet, a time-indicator, a stopping device for said indicator that forms part of the circuit that energizes said magnet, and a thermometer arranged in the storage battery for automatically closing the magnet-energizing circuit when the temperature in the battery reaches a certain degree.

6. A controlling device for the purpose described, comprising a base plate, a switch on said base plate that is adapted to be connected to a charging circuit for a storage battery, means for opening said switch, an electric magnet on said base plate whose armature is provided with means for holding the switch closed, a time-indicator on the base plate, and a stopping means for said indicator controlled by said switch.

7. A controlling device for the purpose described, comprising a base plate, a spring-actuated knife-switch on said base plate that is adapted to be connected to a charging circuit for a storage battery, a projection on the crosspiece of said switch, an electric magnet on said base plate having an armature that is provided with a locking device which coöperates with said projection to hold the switch closed, a time-indicator on the base plate provided with a balance-wheel-arresting member, a rock shaft controlled by the cross-piece of the switch for actuating said balance-wheel-arresting member, and means on the base plate for establishing electrical connection between the supply wires of an energizing circuit, the coils of the magnet, said time-indicator, rock shaft, and the armature of the magnet and the parts of the locking means that coöperate with same.

In testimony whereof I hereunto affix my signature in the presence of two witnesses, this ninth day of May, 1913.

GEORGE H. STAHL.

Witnesses:
FRANK W. CRANE,
ARNOLD V. SCOTT.